(12) United States Patent
Sekiguchi

(10) Patent No.: US 6,870,555 B2
(45) Date of Patent: Mar. 22, 2005

(54) APPARATUS AND METHOD FOR REMOTELY OPERATING A PLURALITY OF INFORMATION DEVICES CONNECTED TO A NETWORK PROVIDED WITH PLUG-AND-PLAY FUNCTION

(75) Inventor: Kiyonori Sekiguchi, Machida (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 695 days.

(21) Appl. No.: 09/765,394

(22) Filed: Jan. 22, 2001

(65) Prior Publication Data

US 2001/0009424 A1 Jul. 26, 2001

(30) Foreign Application Priority Data

Jan. 24, 2000 (JP) ........................................ 2000-013706

(51) Int. Cl.[7] ................................................. G09G 5/00
(52) U.S. Cl. ........................ 345/740; 345/700; 709/217
(58) Field of Search ................................ 345/740, 733, 345/739, 760, 771, 772, 810, 846, 700, 969; 709/217–219, 223–229

(56) References Cited

U.S. PATENT DOCUMENTS

| | | | | |
|---|---|---|---|---|
| 5,956,487 A | * | 9/1999 | Venkatraman et al. | 709/218 |
| 6,138,150 A | * | 10/2000 | Nichols et al. | 709/219 |
| 6,139,177 A | * | 10/2000 | Venkatraman et al. | 700/83 |
| 6,198,479 B1 | * | 3/2001 | Humpleman et al. | 345/733 |
| 6,359,892 B1 | * | 3/2002 | Szlam | 370/401 |
| 6,523,696 B1 | * | 2/2003 | Saito et al. | 709/223 |
| 6,580,950 B1 | * | 6/2003 | Johnson et al. | 700/17 |
| 6,665,303 B1 | * | 12/2003 | Saito et al. | 370/401 |
| 6,735,619 B1 | * | 5/2004 | Sawada | 709/212 |

FOREIGN PATENT DOCUMENTS

| | | |
|---|---|---|
| JP | 9-116985 | 5/1997 |
| JP | 09215097 | 8/1997 |
| JP | 11178076 | 7/1999 |
| JP | 11187061 | 7/1999 |
| JP | 11-328081 | 11/1999 |
| JP | 2000013786 | 1/2000 |
| JP | 2000295246 | 10/2000 |

OTHER PUBLICATIONS

English Language Abstract for JP Appln. No. 11–187061.
English Language Abstract for JP Appln. No. 2000–295246.
English Language Abstract for JP Appln. No. 9–215097.
English Language Abstract for JP Appln. No. 11–178076.
English Language Abstract for JP Appln. No. 2000–13786.
English Language Abstract of JP 11–328081.
English Language Abstract of JP 9–116985.

* cited by examiner

*Primary Examiner*—Sy D. Luu
(74) *Attorney, Agent, or Firm*—Greenblum & Bernstein, P.L.C.

(57) ABSTRACT

When a remote display device is connected to a home network, a home network control apparatus receives a request from the remote display device, shows a display for use in operating a device to be operated on the remote display device, and controls the device to be operated according to a desired operation input from the remote display device.

5 Claims, 9 Drawing Sheets

| IEEE1394 Node ID | IPv4/v6 IP ADDRESS | UID (UNIQUE ID) | DEVICE ATTRIBUTE (PROPERTY) | APPLICATION TYPE |
|---|---|---|---|---|
| #1 | 133.185.245.7 | 123456 | CCD CAMERA | CAMERA AP |
| #2 | 133.185.245.8 | 123457 | DIGITAL TV | TV AP |
| #3 | 133.185.245.9 | 123458 | COLOR PRINTER | PRINTER DRIVER |
| #4 | 133.185.245.A | 123569 | SCANNER | SCANNER AP |
| #5 | 133.185.245.C | 12345A | REFRIGERATOR | REFRIGERATOR AP |
| #6 | 133.185.245.D | 123600 | REMOTE DISPLAY DEVICE | OPERATION AP |
| #63 | 1080::8:800:200C:417A | 12345B | PERSONAL COMPUTER | NONE |

FIG. 3

APPARATUS AND METHOD FOR REMOTELY OPERATING A PLURALITY OF INFORMATION DEVICES CONNECTED TO A NETWORK PROVIDED WITH PLUG-AND-PLAY FUNCTION

BACKGROUND OF THE INVENTION

1. Field of the Invention

The present invention relates to a network control apparatus for controlling operations of peripheral devices and a remote operation device for displaying statuses of the peripheral devices and remotely operating the peripheral devices in an environment for using the peripheral devices connected to a network constructed in the home, office or the like.

2. Description of the Related Art

In recent years, with techniques using the internet progressing remarkably, the internet has been widely spread in not only companies, but also in general homes. The internet is mainly used for e-mail, internet shopping, internet telephone and Web search in the homes. Then it becomes familiar also to the homes to connect a plurality of personal computers and peripheral devices such as a printer as a network to share. This technique is achieved by blending and combining, for example, services provided from an internet provider, technique of networks including Ethernet, internet protocol (IP), and OS of personal computer.

Meanwhile, there is proposed an attempt to connect electric devices (devices to be operated) such as a scanner, digital TV, and refrigerator to a home network to collectively control a lot of electric products (so-called information home electric appliances) existing in the home.

However, most of products connected to the home network to be operated do not have IP addresses. Hence it is impossible to transmit data using the internet from a remote place to the products connected to the home network to be operated such as a digital TV.

Further, it is possible to handle most of the products connected to the home network to be operated only using data format dedicated to the corresponding electric products, and therefore such products require particular conversion processing. For example, when a color image showed on a digital TV is output to a color printer, it is necessary to convert the RGB data format into the CMYK data format.

Further, there is a problem on the operability of products to be operated besides the above-mentioned problems on the IP address and data format. Man-machine interfaces provided on preexisting products to be operated are particularly limited, and therefore it is necessary to greatly change the man-machine interfaces of the products to be operated to use the products in operative connection with others on a network.

SUMMARY OF THE INVENTION

The present invention was carried out in view of the foregoing. It is an object of the present invention to provide an apparatus for greatly improving the operability of products connected to a home network to be operated in using the products on the network, without changing the man-machine interfaces of the products to be operated.

It is an another object of the present invention to provide a remote display device enabling improved operability of the products connected to the home network to be operated in using the products on the network.

In the present invention, when the remote display device is connected to the home network, a home network control apparatus receives a request from the remote display device, shows a display to operate the products to be operated and controls the products to be operated according to inputs on the operation from the remote display device.

It is thereby possible to achieve the improved operability without changing the man-machine interfaces of the preexisting peripheral devices.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a management table of the home network control apparatus according to the above embodiment;

DETAILED DESCRIPTION OF THE PREFERRED EMBODIMENTS

An embodiment of the present invention will be described specifically below with reference to accompanying drawings.

Figure 1:
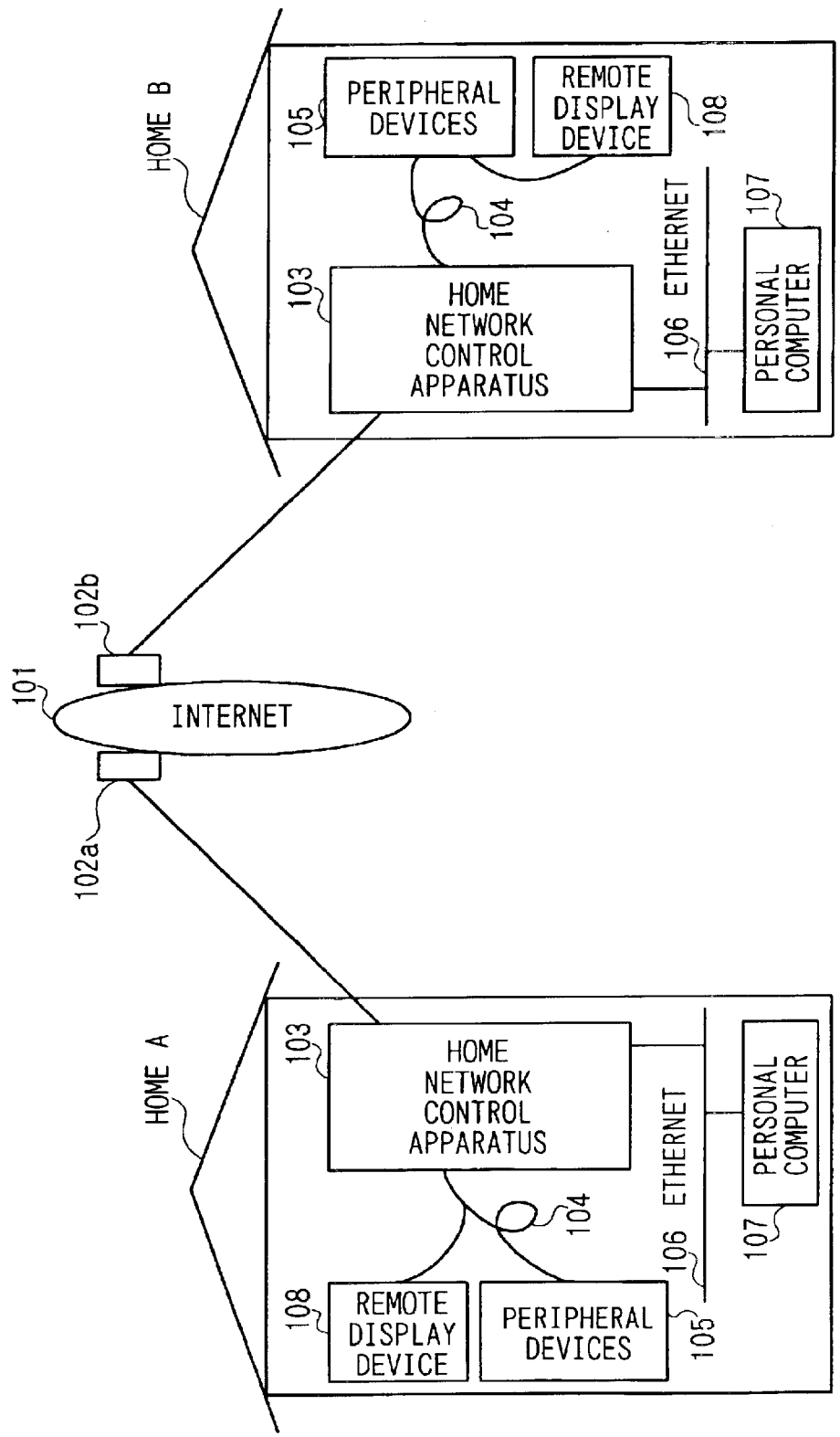
FIG. 1 is a system construction diagram illustrating a situation that home network control apparatuses are used according to one embodiment of the present invention.

FIG. 1 is a diagram illustrating a situation that home network control apparatuses are used according to the present invention. It is constructed that home information networks provided in homes A and B are capable of accessing to the internet 101 via internet service providers 102a and 102b respectively.

Each home network control apparatus 103 connects a respective home information network with internet service provider 102a (102b). Home network control apparatus 103 is connected in parallel to serial bus network 104 conforming to IEEE 1394 (hereinafter referred to as IEEE 1394 network) and Ethernet 106.

IEEE 1394 network 104 connects various peripheral devices 105 that are not able to access to the internet by themselves. Peripheral devices 105 are capable of connecting to IEEE 1394 network 104 easily by connecting to an IEEE 1394 hub. In the present invention, remote display device 108 is connected to the above-mentioned IEEE 1394 hub as one of peripheral devices 105.

It is assumed that Ethernet 106 connects personal computer 107 and other peripheral devices that have respective IP addresses. In addition, some information home electric appliances connected to Ethernet 106 are not able to access to the internet by themselves.

Thus, various information devices (such as a personal computer, printer, scanner, digital TV, digital camera, refrigerator, hot-water supply system, electric power meter, and tap water meter) existing in home A or B are combined as a home information network using home network control apparatus 103, Ethernet 106, and IEEE 1394 network 104.

Although the home information network includes peripheral devices that are not able to communicate through the internet, home network control apparatus 103 enables the peripheral devices to communicate through the internet.

Figure 2:
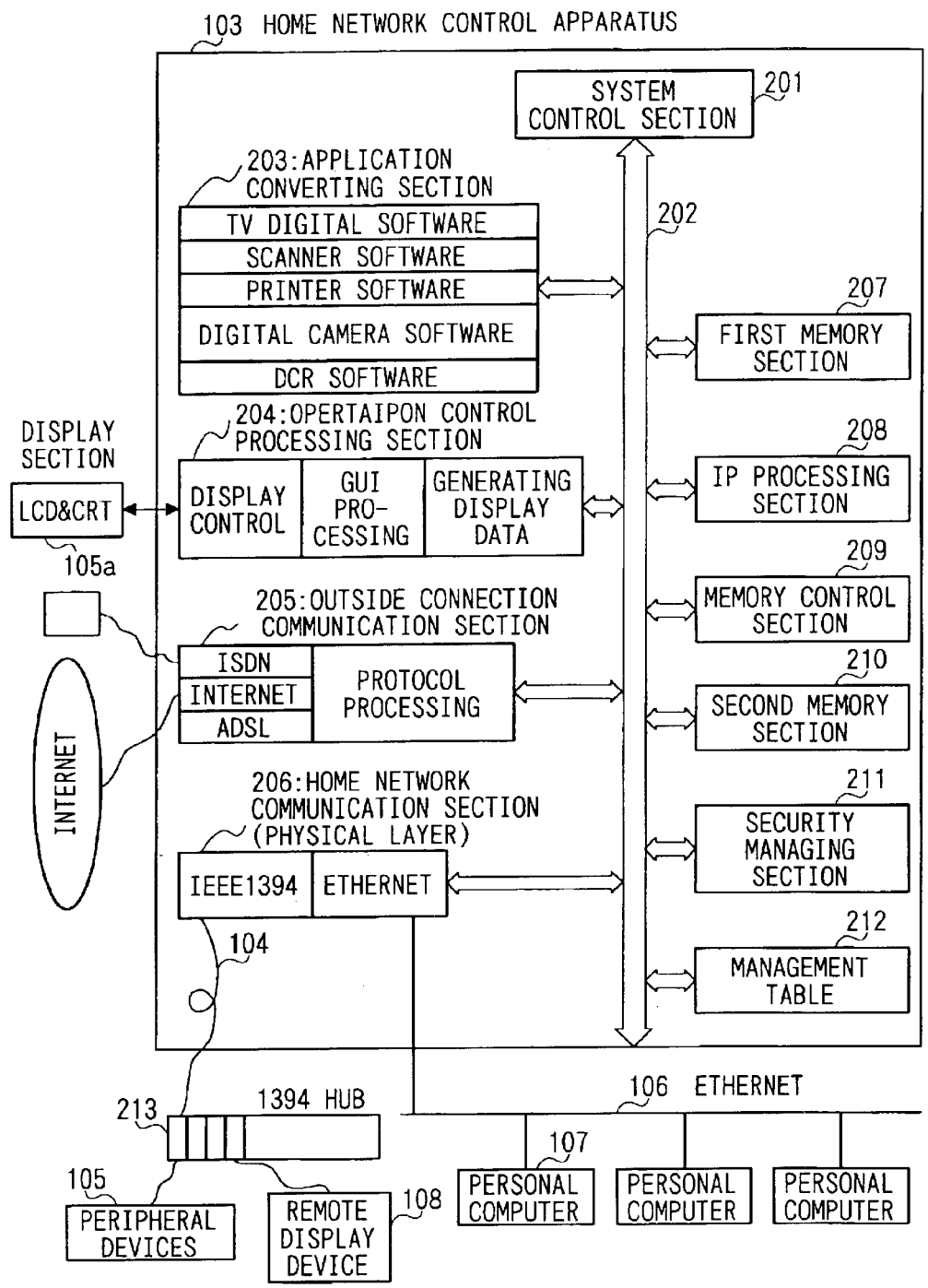
FIG. 2 is a functional block diagram of the home network control apparatus according to the above embodiment.

FIG. 2 illustrates a functional block diagram of home network control apparatus 103.

System control section 201 is comprised of a CPU and controls the entire operation of home network control apparatus 103. System control section 201 communicates data with each section in the apparatus through internal bus 202.

Application converting section 203 are comprised of a plurality of pieces of software prepared corresponding to respective applications (data formats) of the peripheral devices. The software of each device operates to convert data received from another device into data with format enabling the device to handle the data.

Operation control processing section 204 receives an operation request from display section 105a provided in peripheral apparatus 105 and remote display device 108, while outputting an operation display instructed from system control section 201 to display section 105a or remote display device 108. The section 204 performs processing such as GUI processing of a display showed on display section 105a or remote display device 108.

Outside connection communication section 205 performs protocol processing to communicate with an external network (out of home) through a communication medium such as the internet, ISDN and ADSL. For example, when a communication using the internet is performed, an internet protocol is executed.

Home network communication section 206 controls media of IEEE 1394 network 104 and Ethernet 106 composing the home information network. Home network communication section 206 controls communications between peripheral devices 105 connected to the home information network and home network control apparatus 103 (including data transmission between the peripheral devices 105 via home network control apparatus 103).

First memory section 207 is comprised of a RAM and is a work area for use in writing and reading data by application software started by system control section 201.

IP processing section 208 provides functions for identifying and converting an IP address. IP processing section 208 identifies a type of IP address (IPv4 or IPv6) contained in a destination of received data, and adds a destination IP address to transmission data. Further, the section 208 converts an address system of IP address when necessary. For example, the section 208 converts an address system of IPv6 into that of IPv4.

Memory control section 209 controls second memory section 210 to control write and read of data. Second memory section 210 is used to store a program and temporarily store data.

Security managing section 211 protects an improper access to the home network through the internet, using a password.

Management table 212 manages IP addresses assigned to all the peripheral devices including virtual IP addresses used on the home information network. In the present invention, the virtual IP addresses are assigned to peripheral devices (hereinafter referred to as non-IP peripheral devices) that generally do not access to the internet by themselves to communicate and therefore originally do not have an IP address, such as a digital camera, scanner and printer among the peripheral devices.

As shown in FIG. 3, management table 212 controls IEEE 1394 node ID 301, unique ID 303, device attribute 304 and application type 305 each in relation to IP address 302 of each device. Node ID 301 is a device number assigned to each terminal on the IEEE 1394 network. On the IEEE 1394 network, a device is assigned the node ID automatically at the time of connecting to the network, while being assigned a new node ID using a predetermined algorithm at the time of bus reset, and therefore there is a possibility that the node ID changes as the time elapses. Unique ID 303 is an identification number inherently assigned to the device existing on the IEEE 1394 network, and does not change. Device attribute 304 is indicative of a function attribute of the device existing on the IEEE 1394 network. Specifically, device attribute 304 has information that enables recognition of a product (such as camera, television or printer) and function (such as CCD, digital or color) of a CCD camera, digital TV, scanner, color printer or the like. Application type 305 has a number of an application to be converted to be adapted to a designated device. Management table 212 has remote display device 108 registered therewith as one of the peripheral devices connected to IEEE 1394 network 104.

Referring to above-mentioned management table 212 enables a communication partner to be recognized successively even when the node ID is re-assigned automatically at the time the plug-and-play function operates based on the IEEE 1394, and is different from a previous node ID. Further, by starting an application of a device to be used using the IP address, it is possible to perform application conversion service via the internet between the IEEE 1394 devices, between Ethernet devices and between a combination of the devices.

A specific explanation is next given of the contents of operations of the home network control apparatus using remote display device 108.

IEEE 1394 network 104 easily expands the number of connected peripheral devices by using IEEE 1394 hub 213. Meanwhile, among devices installed in the home, there are a small number of devices such as a copier that operate independently to complete the operation thereof, and are a large number of devices that operate with another device(s) to complete a desired operation such as printing that is performed by a scanner and a printer.

In this embodiment, remote display device 108 is connected to IEEE 1394 hub 213 existing in the vicinity of peripheral devices 105 to be used, and a user operates peripheral devices 105 using remote display device 108. For example, a case is assumed that an original is scanned with a scanner that is one of the peripheral devices connected to IEEE 1394 network 104 and the scanned image is printed out from a printer that is also one of the peripheral devices connected to IEEE 1394 network 104. While various settings for the printer cannot be performed conventionally except using a PC having an installed printer driver, the settings are performed with home network control apparatus 103 through remote display device 108 instead of the PC in the present invention.

Figure 4:
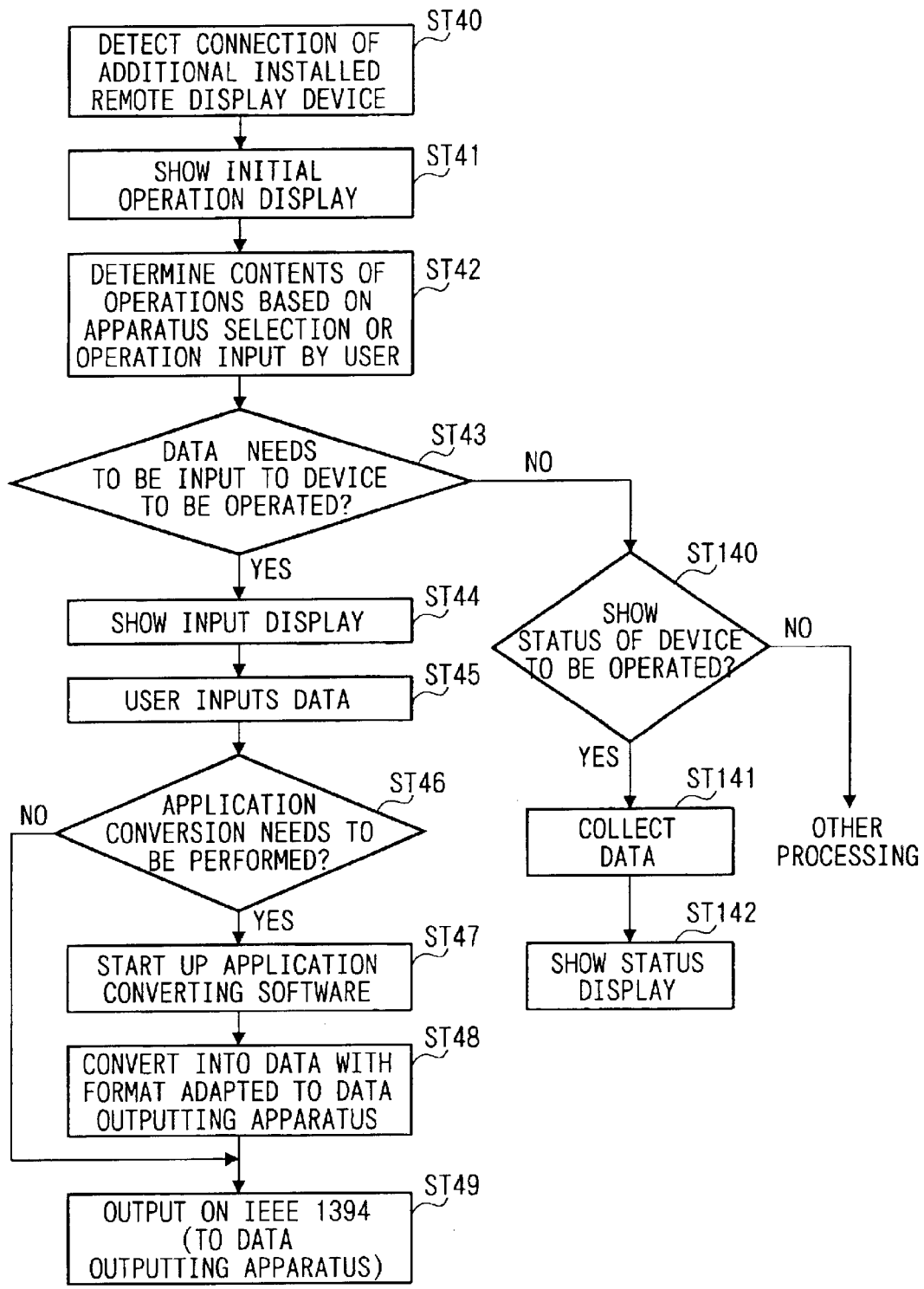
FIG. 4 is a flow diagram of processing in the home network control apparatus when a remote display device is connected to a home network according to the above embodiment.

FIG. 4 is a flow diagram illustrating processing performed in home network control apparatus 103 by connecting remote display device 108 to IEEE 1394 network 104. When remote display device 108 is connected to IEEE 1394 hub 213, the node IDs assigned previously are reset once, and new node IDs are assigned to peripheral devices including remote display device 108.

When remote display device 108 is newly included in the peripheral devices assigned the node ID, system control section 201 judges that remote display device 108 is connected to IEEE 1394 network 104 (ST40).

Figure 5:
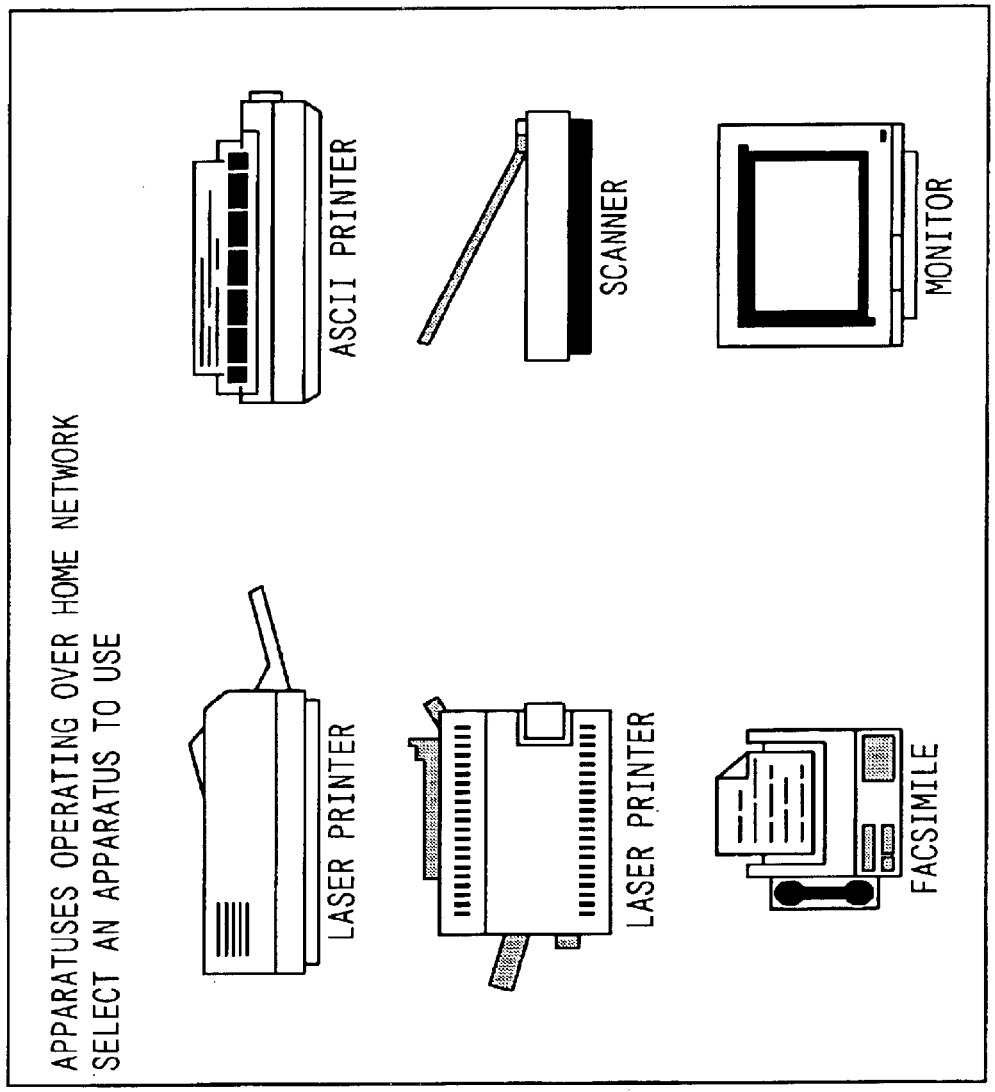
FIG. 5 is a structural diagram of an initial operation display showed on the remote display device.

When remote display device 108 is connected, operation control processing section 204 generates an initial operation display for displaying icons of peripheral devices that needs support of remote display device 108 to operate. FIG. 5 illustrates a structural example of the initial operation display. The display includes character sequences for an operation guidance to a user as well as icons of the peripheral devices. Home network communication section 206 transmits data on the initial operation display generated by operation control processing section 204 to IEEE 1394 network 104. Remote display device 108 fetches data having the node ID thereof from a data stream, thereby fetches the data on the initial operation display from the network, and shows the display shown in FIG. 5 on a display section.

A user selects a device to operate from the initial operation display using the operation section of remote display device 108. Selected data is transmitted from remote display device 108 to IEEE 1394 network 104.

In home network control apparatus 103, home network communication section 206 fetches data having the node ID thereof from the data stream of the network. When the section 206 fetches the data on the selected device transmitted from remote display device 108, the section 206 determines the contents of operations based on the data on the selected device (ST42). For example, when a scanner and a specific printer are selected on the initial operation display, it is judged that the contents of operations are indicative of scanning an original with the scanner and of printing the original with the printer. It is assumed that expected contents of operations are made in the form of a pattern in advance corresponding to a combination of icons (peripheral devices).

In addition, there is a case that the contents of operations are not determined with the display showed once. In this case, showing the display and receiving the data on selection are repeated some times.

Further it may be possible to analyze a character sequence input from the operation section of remote display device 108 to judge the contents of operations, or to provide the operation section with function keys to judge the contents of operations corresponding to a pressed function key, instead of determining the contents of operations only with a selected icon.

Figure 6:
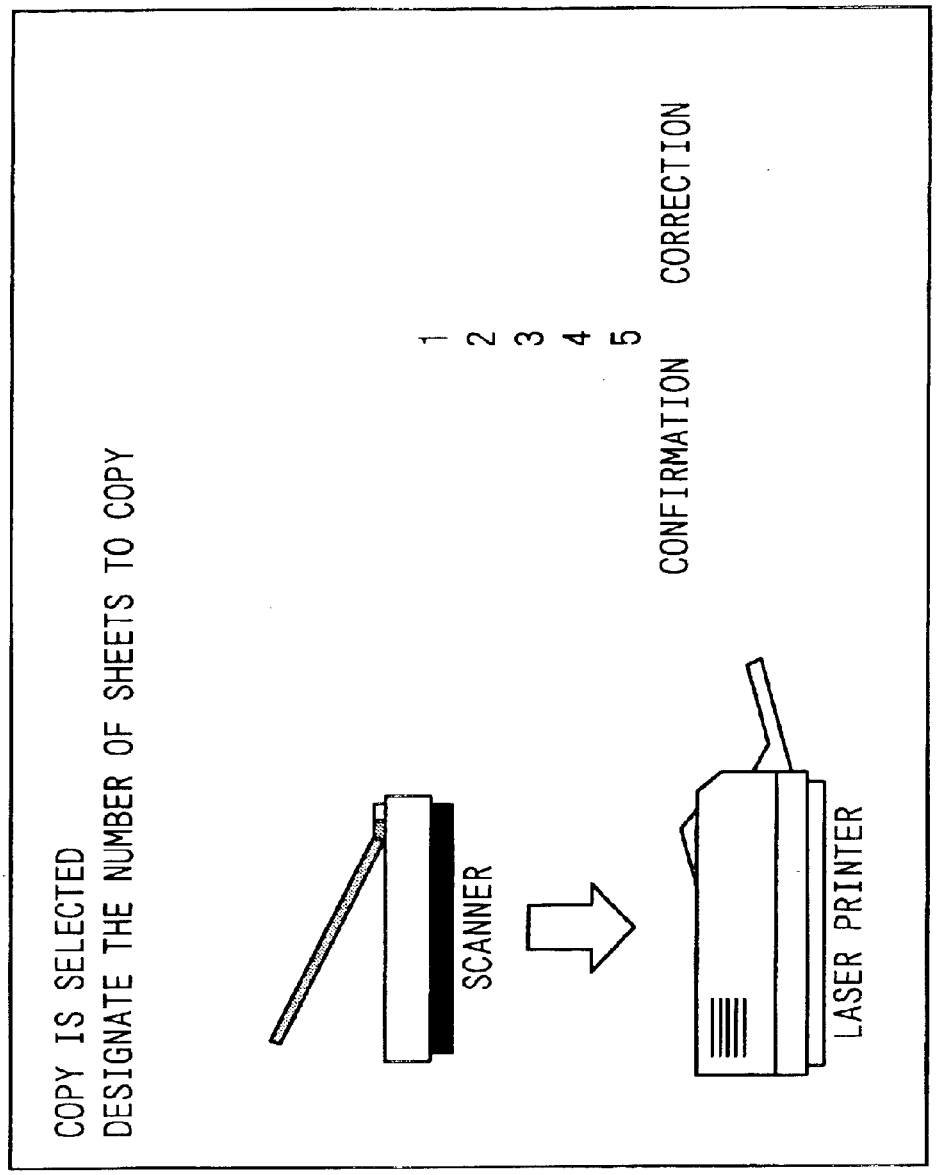
FIG. 6 is a structural diagram of an input display showed on the remote display device.

It is assumed herein that a scanner and a laser printer are selected on the initial operation display. In this case, it is necessary to instruct the laser printer of the number of sheets to print. The apparatus 103 judges that this case needs data input (ST43), generates data on an input display for requesting a user to input data, and transmits the data on the input display to remote display device 108 to display the input display (ST44). FIG. 6 illustrates an input display for use in instructing the laser printer of the number of sheets to print.

For example, when a user selects the number of sheets to copy on the input display (FIG. 6) showed on remote display device 108 and presses a confirmation button, the input data is added the node ID of home network control apparatus 103 and transmitted to the network.

Home network control apparatus 103 acquires the input data transmitted from remote display device 108 from the network (ST45). The apparatus 103 determines whether application conversion is required corresponding to the contents of operation determined at step ST42 (ST46). When the data conversion is required, system control section 201 instructs application converting section 203 to start up corresponding software (ST47). Based on the node ID or UID of the device to be operated (laser printer), the section 201 fetches an application type of the laser printer from management table 212, and acquires a software number to convert data format to be adapted to the laser printer. Thus acquired software number is notified to application converting section 203.

Meanwhile, image data scanned with the scanner operated by the user is transmitted from the scanner to home network control apparatus 103. Home network control apparatus 103 stores the image data received from the scanner in first memory section 207.

Then, the software started by application converting section 203 reads the image data from first memory section 207, and converts the image data into data with format adapted to the laser printer (ST48). Specifically, printer software generates descriptor text required for the printer, and writes again the text in first memory section 207.

Next, system control section 201 provides the image data converted into PDL to home network communication section 206 to transmit to the network with a designated output destination indicative of the laser printer that is previously selected (ST49).

The laser printer fetches the data addressed to the printer from IEEE 1394 network 104, and is thus capable of printing out the data.

Meanwhile, when home network control apparatus 103 judges that the data input is not necessary at abovementioned step ST43, the processing flow shifts to ST140, and the section 103 judges whether or not a request is made for displaying a status of the device to be operated. When the request is made for displaying the status of the device to be operated at ST42, the apparatus 103 collects information on the device to be operated based on, for example, control information stored in management table 212 and first memory section 207 (ST141).

For example, it is assumed that the apparatus 103 receives from remote display device 108 a request for displaying a status of a digital TV that is a peripheral device on IEEE 1394 network 104 of home A, and that data is received via the internet from home B with a destination indicative of the digital TV of home A.

Figure 7:
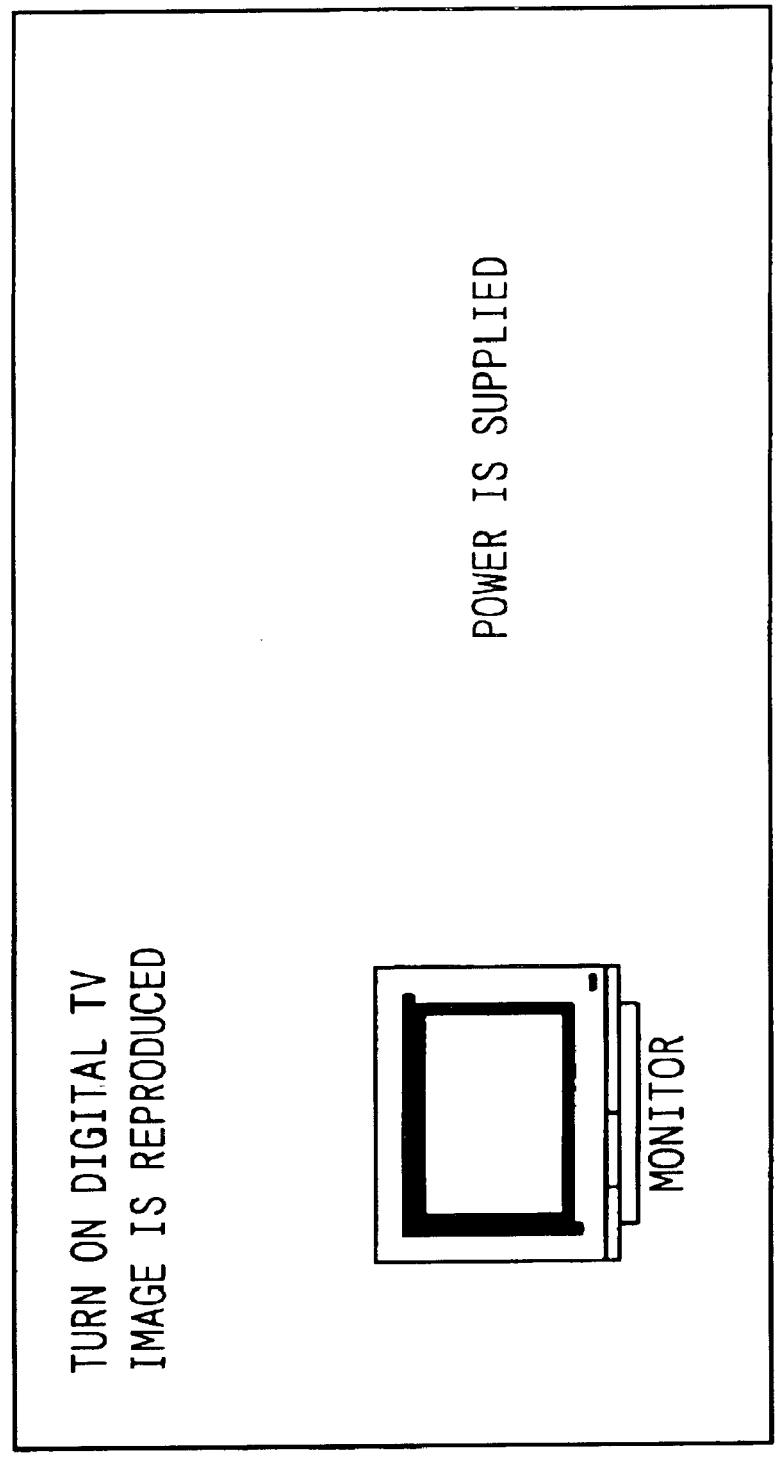
FIG. 7 is a structural diagram of a status displaying display showed on the remote display device.

In this case, the device to be operated is turned off or is not connected to the network when the device is not assigned the node ID, and therefore home network control apparatus 103 generates a status display comprised of a message for instructing a user to turn on the device. Further, when the apparatus 103 detects that received data with a destination indicative of the digital TV is stored in first memory section 207, the apparatus 103 adds another message for notifying the user of the received data to be reproduced to the status display. Then, the apparatus 103 transmits the data on the generated status display to remote display device 108 (ST142). As a result, remote display device 108 shows information on the device to be operated. FIG. 7 illustrates an example of a display showed when a digital TV is selected as a device to be operated of which the status should be showed.

When the user turns on the digital TV and inputs that the power supply is completed from remote display device 108, the received data stored in first memory section 207 is output to the digital TV based on the IEEE 1394. The received data output based on the IEEE 1394 is already converted with software started by application converting section 203 to have a data format enabling the digital TV to display the data, and thereby the digital TV is capable of displaying the received data.

A next explanation is given of the operation when home network control apparatus 103 receives data via the internet. The explanation below describes a case that a non-IP peripheral device on IEEE 1394 network 104 of home A transmits data to a non-IP peripheral device on IEEE 1394 network 104 of home B.

Figure 8:
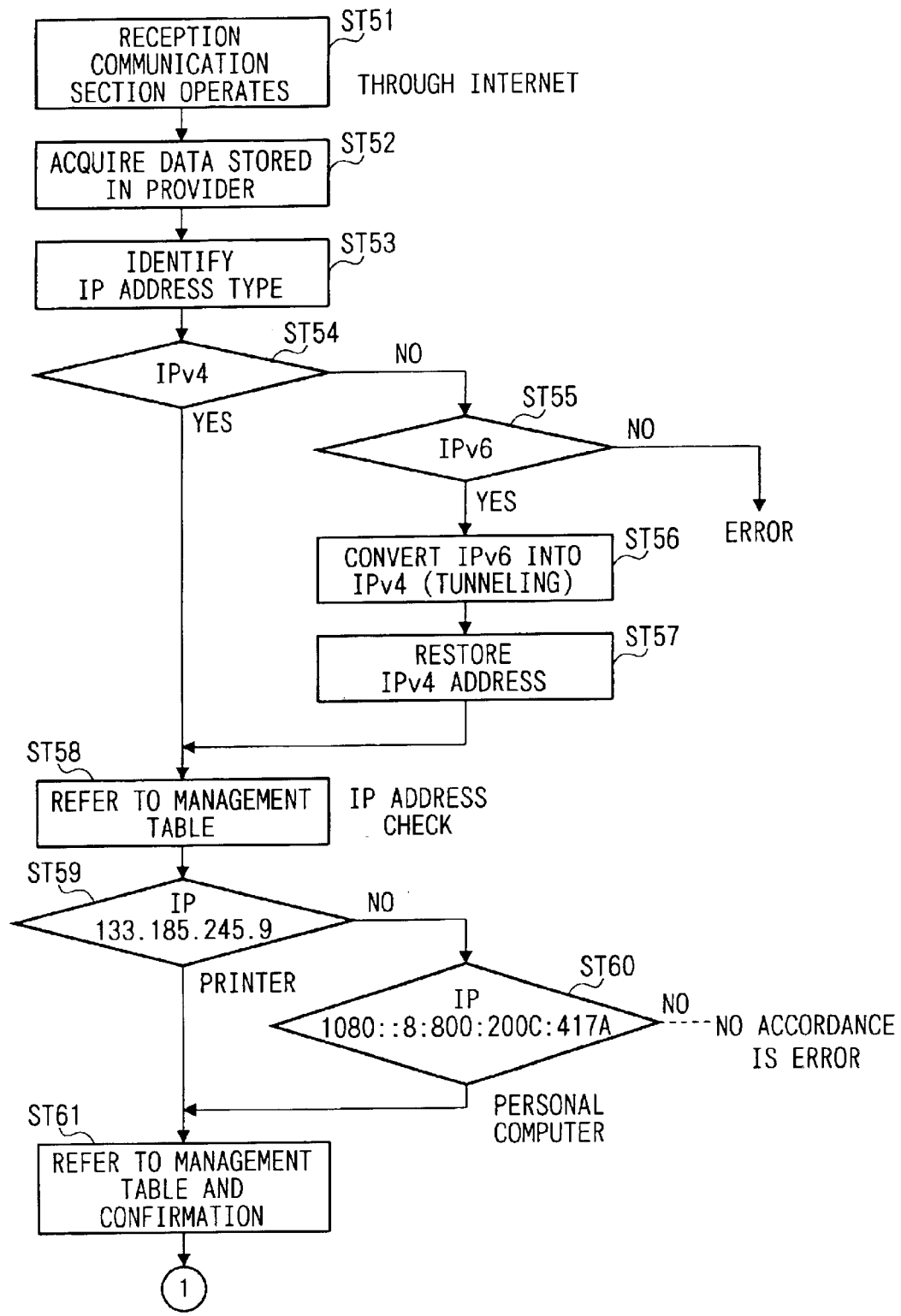
FIG. 8 is a flow diagram illustrating a first half of receiving processing in the home network control apparatus according to the above embodiment.
Figure 9:
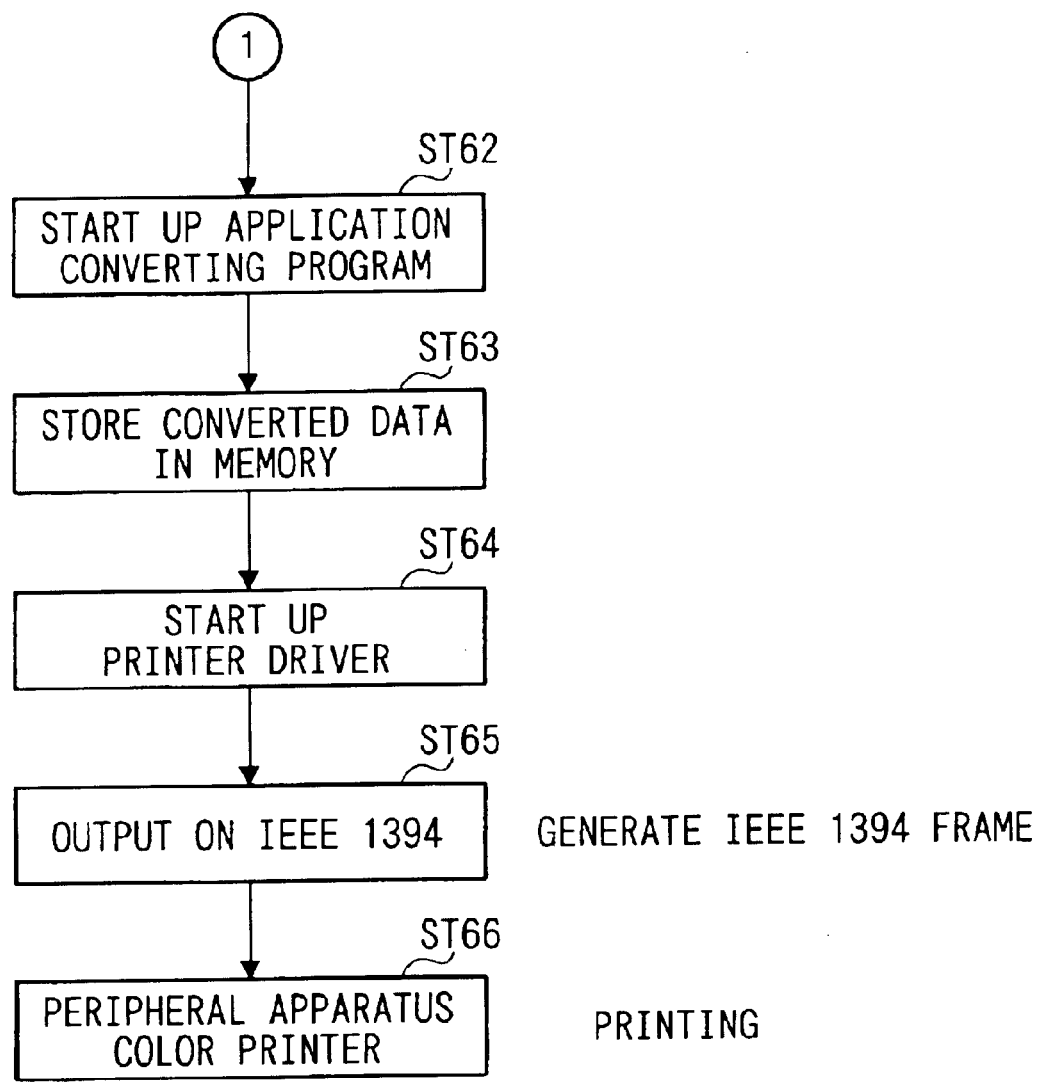
FIG. 9 is a flow diagram illustrating a latter half of the receiving processing in the home network control apparatus according to the above embodiment.

FIGS. 8 and 9 illustrate a flowchart such that home network control apparatus 103 of home B as a receiving side provides data received from internet service provider 102b to non-IP peripheral apparatus 105 to complete the processing.

In home network control apparatus 103 of home B as the receiving side, outside connection communication section 205 operates to access to internet service provider 102b, and acquires data addressed to the home B (ST51 and ST52). The section 205 fetches as the data addressed to home B data having as a designation address an IP address according with the IP address registered with management table 212 installed in home network control apparatus 103.

IP processing section 208 checks the IP address of the fetched received data to identify a type of the IP address (ST53). Specifically, the section 208 identifies whether the IP address is of IPv4 or of IPv6.

When the section 208 judges at step ST53 that an IPv4 peripheral device is designated with an IPv6 address, the IPv6 address is converted into a corresponding IPv4 address (ST56 and ST57) with an IP tunneling technique. Assume that an algorithm for converting IP addresses confirms to RFC of IETF, and that IP datagram is stored in first memory section 207.

Next system control section 201 specifies a peripheral device having the IP address according with the IP address of the received data by referring to management table 212 (ST58, ST59 and ST60). For example, when the IP address of the received data is 133.185.245.9, the section 201 finds it on a column of IP address 302 in management table 212, and according to the contents of the table, recognizes that the destination indicates the printer on the IEEE 1394 network.

System control section 201 judges a device attribute and application type of the peripheral device specified with the IP address from management table 212 (ST61). Further, when the destination indicates a non-IP peripheral device on the IEEE 1394 network, the section 201 concurrently acquires the node ID.

There is a possibility depending on the received data that a peripheral device of the destination is not able to handle the received data when the data is transferred to the device as it is. It is assumed that the datagram stored in first memory section 207 is scanner data transmitted via internet 101, and therefore is not capable of being output to the printer directly. It is necessary to convert the data provided from the transmitting side into data with format enabling the device at the receiving side to process. As described above, applications for converting data into another data with format that respective peripheral devices are capable of interpreting are installed in the home network control apparatus for each peripheral device, and the application numbers are set in management table 212.

System control section 210 acquires the application number from management table 212, and notifies application converting section 203 of the application number, and the section 203 starts up the corresponding software to perform conversion processing. The data converted with the converting program is stored again in first memory section 207 (ST63).

Next system control section 201 starts up a printer driver to convert the data into printer data (ST64). In order to output converted data stored in first memory section 207, a frame confirming to IEEE 1394 is generated with the node ID acquired at the above-mentioned step ST61 as a destination (ST65). Then the frame is transferred to the printer on IEEE 1394 network 104 (ST66).

According to this embodiment as described above, when remote display device 108 is connected to IEEE 1394 network 104, home network control apparatus 103 receives a request from remote display device 108, shows a display for use in operating a device to be operated on remote display device 108, and controls the device to be operated according to a desired operation input from remote display device 108, whereby it is possible to achieve high operability without changing man-machine interfaces of preexisting peripheral devices.

Further, when peripheral devices have different applications, an application type of a device to be operated is recognized from management table 212 and data is converted into another data with format adapted to the device to be operated as an output destination, whereby it is possible to communicate data between devices with different data formats.

Furthermore, management table 212 manages node IDs 301, device attributes 304, and application types 305 based on IP addresses of non-IP peripheral devices, the non-IP peripheral devices that are not capable of directly connecting to the internet conventionally are capable of receiving service supply via the internet such as information retrieval, information collection and e-mail, and the use of applications is made possible to operate devices connected to different home electric appliances networks via the internet.

In addition, while in this embodiment as described above all the peripheral devices are showed on the initial operation display, it may be possible to limit peripheral devices to be showed to some of them in advance according to each condition. For example, a connected peripheral device may be specified that exists in the vicinity of remote display device 108 based on a network structure of IEEE 1394 network 104, and devices related to the contents of operations that the specified device is capable of performing may be showed. For example, while all the printers (three) are showed on the initial operation display illustrated in FIG. 5, the display may be composed so that printers except a laser printer are not showed when remote display device 108 is connected to the laser printer existing in the vicinity of the device 108. The number of peripheral devices to be showed on the initial operation display is thereby reduced, and therefore it is possible to prevent the occurrence of wrong selection and to improve the operability.

Further the remote display device may be provided with a browser function, and the home network control apparatus may be provided with a function of a WWW server for storing files to achieve the above-mentioned operation contents. Then, data may be communicated between the remote display device and the home network control apparatus using xML text (structured text such as HTML). Furthermore, the home network is not limited to IEEE 1394 network and Ethernet. For example, it may be possible to apply, for example, a home network architecture using telephone lines, and home RF such as Blue Tooth that is a short-distance wireless standard.

The present invention is not limited to the above described embodiments, and various variations and modifications may be possible without departing from the scope of the present invention.

This application is based on the Japanese Patent Application No. 2000-013706 filed on Jan. 24, 2000, entire content of which is expressly incorporated by reference herein.

What is claimed is:

1. An apparatus having a display device and connected to a home electric appliance not having an IP address via an IEEE 1394 network, the apparatus comprising:
   a memory configured to store a node ID corresponding to a predetermined ID which is assigned to the home electric appliance, the node ID being assigned to the home electric appliance of the IEEE 1394 network when the home electric appliance is turned ON; and
   a controller configured to check whether the node ID is assigned to the home electric appliance, based on the predetermined ID of the home electric appliance, when the display device is requested to display the status of the home electric appliance on the display device, to judge that the home electric appliance is OFF when the node ID is not assigned to the home electric appliance, and to display, on the display device, a message instructing a user to turn ON the home electric appliance.

2. The apparatus according to claim 1, wherein the display device is connected to the apparatus via the IEEE 1394 network.

3. An apparatus having a display device, connected to a home electric appliance not having an IP address via an IEEE 1394 network, and connected to the Internet, the apparatus comprising:
   a first memory configured to store a node ID corresponding to an predetermined ID which is assigned to the home electric appliance, the node ID being assigned to the home electric appliance of the IEEE 1394 network when the home electric appliance is turned ON;
   a second memory configured to store received data; and
   a controller configured to receive Internet packet data from the Internet, to transform the Internet packet data to data which the home electric appliance can receive, and to store the transformed data in the second memory;
   the controller being configured to check whether the node ID is assigned to the home electric appliance, based on the predetermined ID of the home electric appliance when the display device is requested to display the status of the home electric appliance on the display device, to judge that the home electric appliance is OFF when the node ID is not assigned to the appliance, and to display, on the display device, a message instructing a user to turn ON the home electric appliance;
   the controller being further configured to display, on the display device, another message notifying the user of the received data in the second memory.

4. The apparatus according to claim 3, wherein the display device is connected to the apparatus via the IEEE 1394 network.

5. A method for remotely operating a home electric appliance not having an IP addresses via an IEEE 1394 network, a memory storing a node ID corresponding to a predetermined ID which is assigned to the home electric appliance, the node ID being assigned to the home electric appliance of the IEEE 1394 network when the home electric appliance is turned ON, the method comprising:
   checking whether the node ID is assigned to the home electric appliance based on the predetermined ID of the home electric appliance when display of the status of the home electric appliance is requested;
   judging that the home electric appliance is OFF when the node ID is not assigned to the home electric appliance; and
   displaying a message instructing a user to turn ON the home electric appliance.

* * * * *